(12) United States Patent
Petit et al.

(10) Patent No.: US 11,279,498 B2
(45) Date of Patent: Mar. 22, 2022

(54) SUPPORT MEMBER

(71) Applicant: Airbus Operations Limited, Bristol (GB)

(72) Inventors: David Petit, Bristol (GB); Eric Bonte, Bristol (GB); Daniel Peachey, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 245 days.

(21) Appl. No.: 16/520,860

(22) Filed: Jul. 24, 2019

(65) Prior Publication Data

US 2020/0031499 A1 Jan. 30, 2020

(30) Foreign Application Priority Data

Jul. 30, 2018 (GB) ...................... 1812353

(51) Int. Cl.
*B64F 5/00* (2017.01)
*B64D 37/00* (2006.01)
*F16L 3/12* (2006.01)
*B64C 3/18* (2006.01)

(52) U.S. Cl.
CPC ............... *B64F 5/00* (2013.01); *B64C 3/187* (2013.01); *B64D 37/00* (2013.01); *F16L 3/12* (2013.01)

(58) Field of Classification Search
CPC . B64F 5/00; B64C 3/187; B64D 37/00; F16L 5/00; F16L 3/1222; F16L 3/12
See application file for complete search history.

(56) References Cited

U.S. PATENT DOCUMENTS

| | | | |
|---|---|---|---|
| 3,649,054 A | 3/1972 | McClenan | |
| 4,739,954 A | 4/1988 | Hamilton | |
| 4,985,801 A * | 1/1991 | Hellard | B64D 45/02 |
| | | | 174/70 R |
| 5,681,014 A * | 10/1997 | Palmer | B64C 3/52 |
| | | | 244/219 |
| 6,352,115 B1 | 3/2002 | Mathieu | |
| 6,450,553 B1 * | 9/2002 | Suresh | B21D 39/04 |
| | | | 285/382 |
| 9,061,768 B2 * | 6/2015 | Hansom | B64D 37/00 |

(Continued)

FOREIGN PATENT DOCUMENTS

| | | |
|---|---|---|
| DE | 1973732 | 11/1967 |
| DE | 40 06 760 | 6/1991 |

(Continued)

OTHER PUBLICATIONS

Extended European Search Report for European Application No. EP 19186412.3, nine pages, dated Nov. 18, 2019.

(Continued)

*Primary Examiner* — Philip J Bonzell
*Assistant Examiner* — Michael B. Kreiner
(74) *Attorney, Agent, or Firm* — Nixon & Vanderhye P.C.

(57) ABSTRACT

A support member configured to support a first structure within an aperture of a second structure is disclosed. The support member comprises a bracket for attaching the support member to the second structure; and a funnel part. The diameter of the base of the funnel is less than or equal to the diameter of the aperture, and is substantially equal to the diameter of a part of the first structure to be supported by the support member.

22 Claims, 8 Drawing Sheets

(56) References Cited

U.S. PATENT DOCUMENTS

| | | | | |
|---|---|---|---|---|
| 2008/0078880 | A1* | 4/2008 | Petit | F16L 21/03 |
| | | | | 244/135 R |
| 2009/0256352 | A1* | 10/2009 | Petit | F16L 25/01 |
| | | | | 285/123.15 |
| 2010/0122749 | A1* | 5/2010 | Bouleti | F16L 25/01 |
| | | | | 138/177 |
| 2012/0057267 | A1* | 3/2012 | Petit | F16L 25/01 |
| | | | | 361/215 |
| 2012/0104172 | A1* | 5/2012 | Haug | B29D 23/008 |
| | | | | 244/135 R |
| 2012/0132755 | A1* | 5/2012 | Petit | F16L 5/12 |
| | | | | 244/131 |
| 2013/0099067 | A1* | 4/2013 | Hansom | B64D 37/32 |
| | | | | 248/56 |
| 2014/0246112 | A1* | 9/2014 | Flynn | F16J 15/064 |
| | | | | 138/155 |
| 2016/0169279 | A1 | 6/2016 | Okamoto et al. | |
| 2017/0066542 | A1* | 3/2017 | James | B64D 37/005 |
| 2020/0031489 | A1* | 1/2020 | Edwards | B64D 37/005 |
| 2020/0055611 | A1* | 2/2020 | Walters | H01B 17/38 |
| 2020/0072391 | A1* | 3/2020 | Bonte | F16L 5/025 |

FOREIGN PATENT DOCUMENTS

| | | |
|---|---|---|
| DE | 20 2006 001 675 | 4/2006 |
| JP | 7-260049 | 10/1995 |

OTHER PUBLICATIONS

Combined Search and Examination Report for GB1812353.9, dated Jan. 22, 2019, 8 pages.

\* cited by examiner

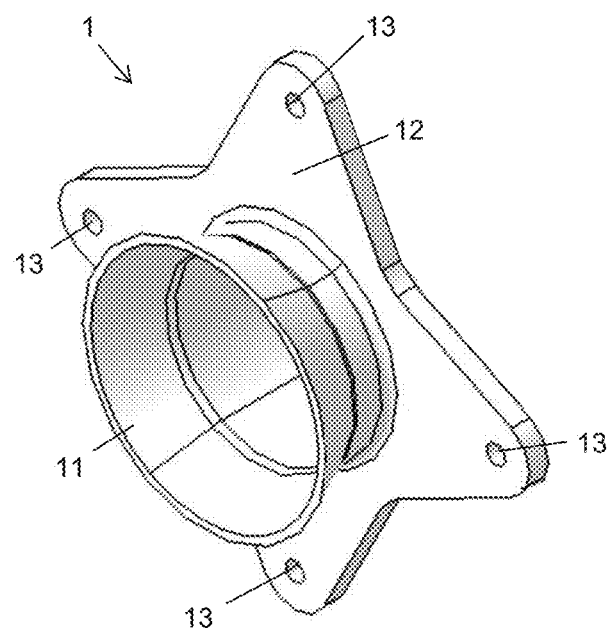
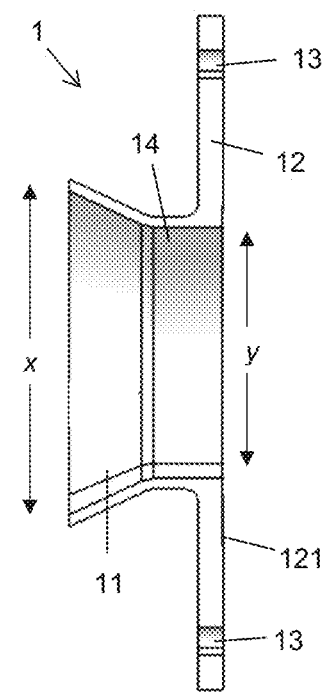
Fig. 1a
Fig. 1b
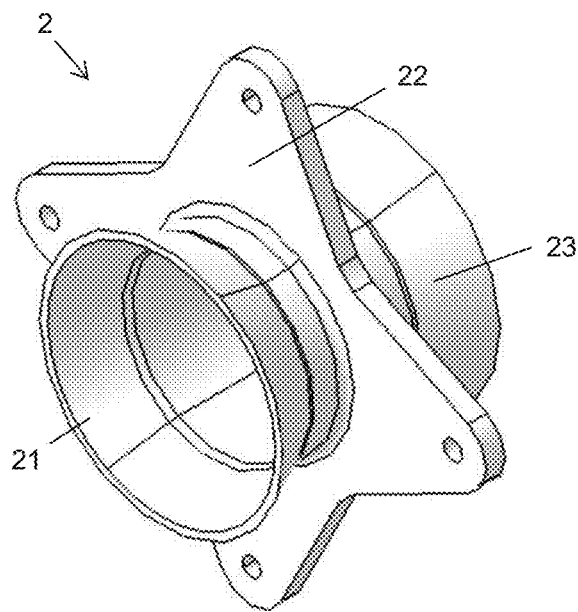
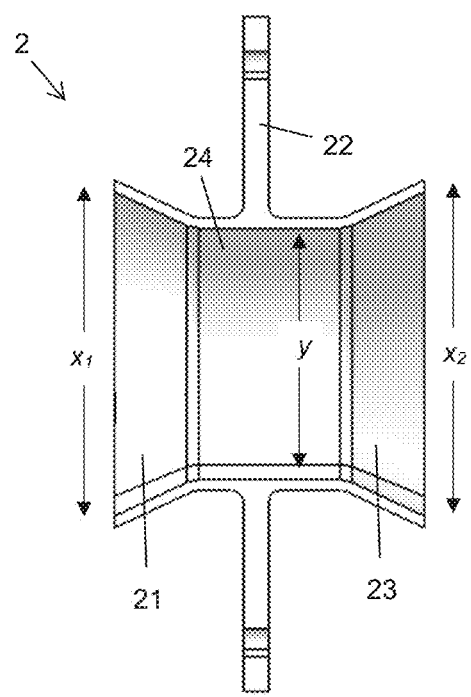
Fig. 2a
Fig. 2b

SUPPORT MEMBER

CROSS RELATED APPLICATION

This application claims priority to United Kingdom (GB) Patent Application 1812353.9, filed Jul. 30, 2018, the entire contents of which are hereby incorporated by reference.

TECHNICAL FIELD

The present invention relates to an aircraft assembly comprising a rib having an aperture and a support member for supporting a substantially longitudinal structure within the aperture, to a kit of parts comprising a plurality of such support members; and to a method of installing a longitudinal structure on a plurality of ribs in an aircraft wing.

BACKGROUND

Pipework for transporting fuel within an aircraft wing is conventionally made up of multiple pipe sections, which connect to each other via connectors mounted on ribs. Each pipe section spans, at most, a single rib bay (that is, the space between adjacent ribs). Installation, maintenance and removal of this type of pipework requires accessing the interior of each rib bay via one or more manholes in the lower wing cover and/or in the ribs.

Various drawbacks are associated with providing manholes in aircraft structures. For example, the structure incorporating the manhole must typically be reinforced, making it heavier and more complex to manufacture than if it did not have a manhole. The need to access interior spaces such as rib bays also limits design freedom for novel wing structures.

An alternative way of installing pipework in an aircraft structure, and especially a wing structure, which reduces or eliminates the need for manholes is therefore desired.

SUMMARY

A first aspect of the present invention provides an aircraft assembly comprising a rib having an aperture and a support member for supporting a substantially longitudinal structure within the aperture. The support member has a funnel part, and is fixedly attached to the rib such that the funnel part is coaxial with the aperture. The diameter of the base of the funnel is less than or equal to the diameter of the aperture, and is substantially equal to the diameter of a part of the substantially longitudinal structure.

Optionally, the support member further comprises an additional funnel part, arranged coaxially with the funnel part such that the base of the additional funnel part is connected to the base of the funnel part.

Optionally, the diameter of the mouth of the funnel part and/or the diameter of the mouth of the additional funnel part is less than or equal to the diameter of the aperture.

Optionally, at least part of the support member has a low-friction coating.

Optionally, the bracket comprises a flange configured to at least partially cover the aperture.

Optionally, at least part of the support member is disposed within the aperture.

Optionally, the support member extends through the aperture and has an additional funnel part coaxial with the funnel part, and the funnel part extends away from a first side of the rib and the additional funnel part extends away from a second, opposite side of the rib.

Optionally, the aperture is partially blocked by the support member.

Optionally, the assembly further comprises a further rib having a further aperture; and a further support member for supporting a substantially longitudinal structure within the aperture. The further support member has a further funnel part and is fixedly attached to the further rib such that the funnel part is coaxial with the aperture. The further aperture is coaxial with the aperture.

Optionally, the diameter of the base of the funnel part is greater than the diameter of the base of the further funnel part.

Optionally, the assembly further comprises a substantially longitudinal structure within the aperture, wherein the longitudinal structure is oriented coaxially with the funnel part of the support member and extends through the funnel part of the support member.

Optionally, the external diameter of at least the part of the longitudinal structure disposed within the base of the funnel part is substantially equal to the internal diameter of the base of the funnel part.

Optionally, the longitudinal structure comprises a collar configured to fit within the base of the funnel part. Optionally, the collar is configured to seal against the base of the funnel part.

Optionally, if the assembly further comprises a further rib, the external diameter of a first part of the longitudinal structure which is disposed within the base of the funnel part is substantially equal to the internal diameter of the base of the funnel part, and the external diameter of a second part of the longitudinal structure which is disposed within the base of the further funnel part is substantially equal to the internal diameter of the base of the further funnel part.

Optionally, the longitudinal structure is a component of an aircraft system. Optionally, the longitudinal structure is a tube for transporting a fluid.

A second aspect of the present invention provides an aircraft comprising an assembly according to the first aspect.

A third aspect of the present invention provides a kit of parts comprising a plurality of support members, each support member being configured to support a longitudinal structure within an aperture of an aircraft rib and each support member comprising a funnel part and a flange for attaching the support member to the rib. The diameter of the narrow end of the funnel part is less than or equal to the diameter of the aperture, and is substantially equal to the diameter of a part of the longitudinal structure to be supported by the support member. The internal diameter of the narrow end of the funnel part of each support member is unique.

Optionally, the kit of parts further comprises a plurality of collars, each collar corresponding to one of the support members. Each collar is configured to be fixedly attached circumferentially to a longitudinal structure.

Optionally, the external diameter of each collar is unique and matches the internal diameter of the funnel base of the corresponding support member.

Optionally, the external diameter of each collar and/or the internal diameter of the funnel base of the support member corresponding to that collar is selected to create an interference fit between the collar and the funnel base when the collar is disposed within the funnel base.

Optionally, each collar is shaped such that, when that collar is attached to the longitudinal structure, the angle between the external surface of the collar and the adjacent external surface of the longitudinal structure is an obtuse angle.

A fourth aspect of the present invention provides a method of installing a longitudinal structure on a plurality of ribs in an aircraft wing. The method comprises:

providing a first rib having a first aperture and a second rib having a second aperture such that a space between the first and second ribs is defined, wherein the first and the second ribs are separated by a distance D;

providing a first support member having a first funnel part on the first rib such that the funnel part is coaxial with the first aperture, and providing a second support member having a second funnel part on the second rib such that the funnel part is coaxial with the second aperture;

providing a longitudinal structure having a length greater than D; and inserting an end of the longitudinal structure into the funnel part of the first support member and subsequently inserting the end of the longitudinal structure into the funnel part of the second support member.

During the inserting, there is no contact with any part of the longitudinal structure disposed between the first and second ribs.

Optionally, the method further comprises:

providing one or more intermediate ribs between the first and second ribs, the or each intermediate rib having an aperture;

providing a support member having a funnel part to the or each intermediate rib such that the funnel part is coaxial with the aperture; and after inserting the end of the longitudinal structure into the funnel of the first support member and before inserting the end of the longitudinal structure into the funnel part of the second support member, inserting the end of the longitudinal structure into the funnel part of the support member on the or each intermediate rib.

Optionally, at least one of the inserting steps comprises manipulating the longitudinal structure at or near a second end of the longitudinal structure opposite to the end being inserted.

Optionally, providing a longitudinal structure having a length greater than D comprises:

providing a first section of the longitudinal structure, wherein the first section has a length less than D;

inserting a first end of the first section into the funnel part of the first support member;

providing a second section of the longitudinal structure, wherein the second section has a length less than D; and connecting a first end of the second section to a second end of the first section such that the second section is coaxial with the first section.

Optionally, between the inserting of the end of the longitudinal structure into the funnel part of the first support member and the inserting of the end of the longitudinal structure into the funnel part of the second support member, the method comprises inserting a joint between the first section and the second section into the funnel part of the first support member.

BRIEF DESCRIPTION OF THE DRAWINGS

Embodiments of the invention will now be described, by way of example only, with reference to the accompanying drawings, in which:

FIGS. 1a and 1b show a first example support member according to the invention;

FIGS. 2a and 2b show a second example support member according to the invention;

DETAILED DESCRIPTION

Figure 3:
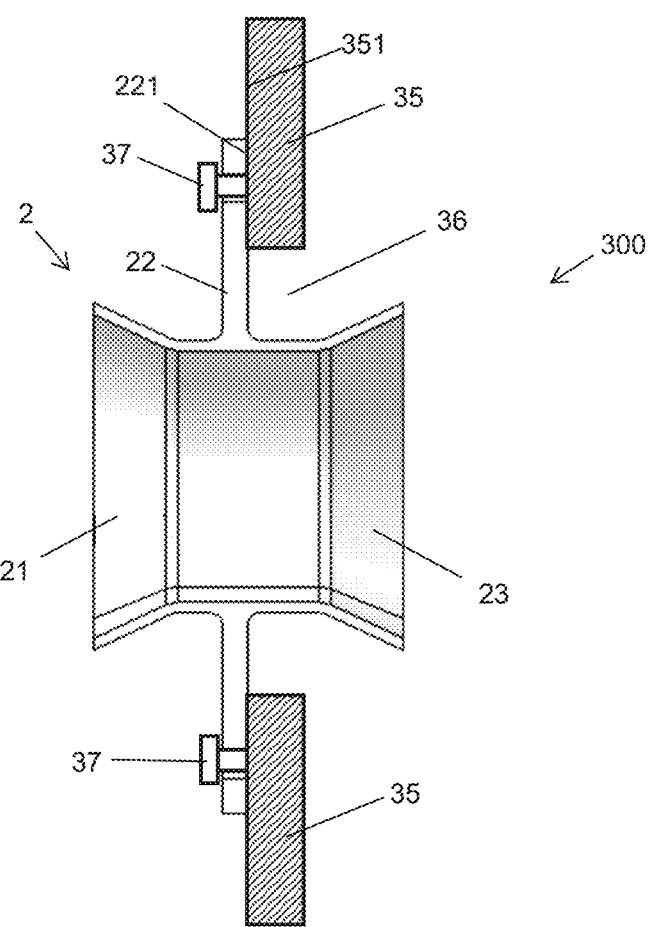
FIG. 3 is a cross-section through a first example assembly according to the invention.

The examples described below relate to installing a first structure within an aperture of one or more aircraft ribs, in particular where the first structure is a longitudinal structure such as a pipe or rod. In each of the examples, installation of the first structure is facilitated by a support member configured to support the first structure within the aperture of a rib. Each support member according to the invention comprises a bracket for attaching the support member to the rib, and a funnel part. The diameter of the base of the funnel part is less than or equal to the diameter of the aperture, and is substantially equal to the diameter of a part of the first structure.

In the following description certain structures are referred to as "longitudinal structures". This is intended to mean that such structures have a length that is significantly greater (at least twice as great, and typically at least ten times as great) than their width. The axis of such a longitudinal structure may typically be parallel to a long side of the structure. A longitudinal structure does not need to be perfectly straight. By contrast, an aircraft rib is considered to be a "planar" or "substantially planar" structure. A substantially planar structure is considered to have at least one flat (or substantially flat) surface that makes up a significant portion (i.e. at least 20%) of the surface area of the structure. Typically a planar structure may have two opposing flat surfaces. An aperture in a planar structure such as an aircraft rib should be understood to extend through the plane. The axis of the aperture may typically (but not necessarily) be substantially perpendicular to the flat surface of the planar structure.

For ease of reference, the term "diameter" is used throughout the description to denote the size of structures (typically in the plane perpendicular to the axial direction of the structure). Although many or all of these structures may be circular in the illustrated examples and in typical implementations of the invention, the use of "diameter" should not be taken to mean that such structures must necessarily be circular. For non-circular structures, "diameter" may be considered to mean a largest dimension in the plane perpendicular to the axial direction of the structure.

The invention may be particularly advantageous for applications in which the first structure is being installed into a space which is difficult or impossible to access, either visually or physically. An example of such a space is a rib bay in an aircraft wing box. The invention facilitates the installation of longitudinal structures such as fuel pipes on the ribs of an aircraft wing box after construction of the wing box is complete (i.e. such that each rib bay is a substantially enclosed space). Some embodiments of the invention may facilitate removal of the first structure from the one or more ribs. Examples of the invention may speed up the process of installing a longitudinal first structure on one or more ribs.

FIG. 1 shows a first example support member 1, which is suitable to be comprised in an aircraft assembly according to the invention. The support member 1 is configured to be attached to a rib of an aircraft wing and to support a longitudinal structure (not shown) within an aperture of the rib. The support member 1 comprises a bracket 12 and a funnel part 11. The bracket 12 is configured to attach the support member to the rib. In the illustrated example, the bracket has a substantially flat surface 121 configured to abut a substantially flat surface of the rib. Holes 13 extend through the bracket 12, to facilitate attaching the support member 1 to the rib using fasteners. Any other suitable attachment mechanism may alternatively be used. The bracket 12 is in the form of a flange, which at least partially covers the aperture when the support member 1 is attached to the rib. In some examples, apart from the central opening that extends through the support member 1, the flange may completely cover the aperture when the support member 1 is attached to the rib. In other examples there may be one or more gaps between the outer edge of the flange and the edge of the aperture.

The funnel part 11 has an internal diameter y at the base of the funnel that is less than or equal to the diameter of the aperture of the rib to which the support member 1 is configured to be attached. The internal diameter y of the funnel base is substantially equal to the diameter of a part of the longitudinal structure which is to be supported by the support member 1. The mouth of the funnel part 11 has an internal diameter x that is larger than the diameter y of the funnel base. In the illustrated example, the funnel part 11 is formed integrally with the bracket 12, although this need not be the case in other examples. The particular example support member of FIGS. 1a-b has a cylindrical section 14 between the base of the funnel part 11 and the bracket 12. In other examples this cylindrical section may be omitted, such that the funnel base joins directly to the bracket 12.

The support member 1 may be formed from any substantially rigid material, although plastics materials may be advantageous for reasons of weight and ease of manufacture. In some examples at least the internal surface of the funnel part may comprise a low-friction material, such as PTFE, to facilitate sliding of the longitudinal structure relative to the support member during installation of the longitudinal structure.

FIGS. 2a and 2b show a second example support member 2 configured to be attached to a rib of an aircraft wing (not shown), and to support a longitudinal structure (not shown) within an aperture of the rib. The support member 2 comprises a funnel part 21 and a bracket 22 which have the same features as the funnel part 11 and bracket 12 of the first example support member 1. The support member 2 further comprises an additional funnel part 23. In the illustrated example the additional funnel part 23 is the same shape and size as the funnel part 21 (that is, the diameter $x_2$ of the mouth of the additional funnel part 23 is the same as the diameter $x_1$ of the mouth of the funnel part 21, and the axial length of the additional funnel part 23 is equal to the axial length of the funnel part 21) although this need not be the case in all examples. The additional funnel part 23 is arranged coaxially with the funnel part 21 such that the base of the additional funnel part 23 is connected to the base of the funnel part 21 (in this example, the connection is via a cylindrical section 24 disposed between the funnel part 21 and the additional funnel part 23).

The support member 2 may be configured to extend through the aperture of the rib. In such examples the aperture is configured to allow the mouth of one of the funnel parts 21, 23 to pass through the aperture. That is, the aperture may be at least as large as the mouth of one of the funnel parts 21, 23. In such examples the diameter of the mouth of the funnel part 21 and/or the diameter of the mouth of the additional funnel part 23 is less than or equal to the diameter of the aperture.

The support member 2 facilitates insertion of the longitudinal structure (or a collar attached to the longitudinal structure) into the aperture in the rib from either direction. As such, the support member 2 may facilitate removal of the longitudinal structure from the rib as well as facilitating installation of the longitudinal structure in the aperture of the rib, as will be further described below with reference to FIG. 7.

FIG. 3 shows an example aircraft assembly 300 comprising a rib 35 and the example support member 2. The rib 35 may be the rib referred to in relation to FIGS. 1a-b and 2a-b. The rib 35 has an aperture 36, and the support member 2 is configured to support a substantially longitudinal structure (which may be the longitudinal structure referred to in relation to FIGS. 1a-b and 2a-b) within the aperture 36. The support member 2 is fixedly attached to the rib 35 such that the funnel parts 21, 23 of the support member 2 are coaxial with the aperture 36. A flat surface of the bracket 221 abuts a flat surface 351 of the rib 35. Fasteners 37 extend through the holes in the bracket 22 to fixedly attach the support member 2 to the rib 35. Four such fasteners are used, although only two are visible in FIG. 3. Any suitable alternative attachment mechanism known in the art may be used instead of the fasteners 37.

The aperture 36 is circular, and has a diameter greater than the external diameter of the mouth of the additional funnel part 23 but less than (at least) a longest dimension of the bracket 22. The aperture 36 is partially blocked by the support member 2. In the particular example, the bracket 22 completely blocks the region of the aperture 36 surrounding the cylindrical part of the support member 2 (although this need not be the case in all examples), such that only the region of the aperture 36 inside the cylindrical part (that is, the opening defined by the support member 2) is not blocked.

A part of the support member 2 may be disposed within the aperture 36. In the illustrated example the support member 2 has a funnel part 21 which extends away from a first side of the rib 35 and an additional funnel part 23 which extends away from a second, opposite side of the rib 35. The additional funnel part 23 extends through the aperture 36. In other examples the support member may be a support member 1 of the type shown in FIGS. 1a-b, in which case the funnel part of the support member 1 may or may not extend through the aperture 36, depending on whether the flat surface 221 or the opposing flat surface of the support member bracket abuts the rib 35. Either orientation of a single funnel support member 1 may be utilised in forming the assembly 300, or any other assembly according to the invention.

Figure 4A:
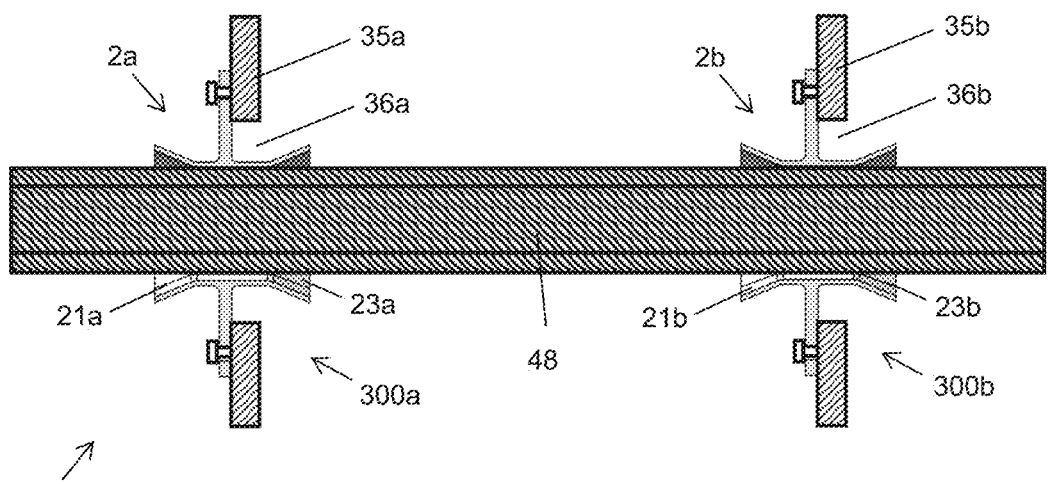
FIG. 4a is a cross-section through a second example assembly according to the invention.

FIG. 4a shows a further example assembly 400 comprising a first sub-assembly 300a and a second sub-assembly 300b, each of which has the same features as the example assembly 300 described above. The first and second sub-assemblies 300a, 300b are arranged such that the funnel parts 21a, 23a, 21b, 23b of the support members 2a, 2b of the first and second sub-assemblies 300a, 300b are coaxial (and such that the apertures of the ribs 35a, 35b of the first and second assemblies 300a, 300b are coaxial). In the particular example of FIG. 4a, the base diameters of each of the funnel parts 21a, 23a, 21b, 23b are substantially equal. Consequently, the diameters of the cylindrical parts of the support member 2a, 2b are substantially equal in this example.

Although only two sub-assemblies are shown in FIG. 4a, in principle the assembly 400 may comprise any number of sub-assemblies of the type shown in FIG. 3. Considerations discussed below in relation to the sub-assemblies 300a, 300b will also apply to any such further sub-assemblies comprised in the assembly 400.

A substantially longitudinal structure 48 is supported within the apertures of the first and second ribs 35a, 35b by the respective support members 2a, 2b. The longitudinal structure 48 is oriented coaxially with the funnel parts 21a, 23a, 21b, 23b of the support members 2a, 2b and extends through the funnel parts. The particular illustrated longitudinal structure 48 comprises a pipe, e.g. for transporting a fluid. The external diameter of the longitudinal structure 48 is substantially equal to the internal base diameter of the funnel parts 21a, 23a, 21b, 23b. In some examples the external diameter of the longitudinal structure 48 is smaller than the internal base diameter of the funnel parts 21a, 23a, 21b, 23b.

The longitudinal structure 48 may be flexible. Preferably the longitudinal structure is self-supporting such that it is substantially straight in the axial direction between the first and second support members 2a, 2b (that is, no substantial sagging or bowing of the longitudinal structure occurs between the first and second support members 2a, 2b). The distance between the support members 2a, 2b may be selected in dependence on the flexibility of the longitudinal structure 48, to prevent or minimise bending of the longitudinal structure 48 in the region between the support members 2a, 2b. In some examples the longitudinal structure 48 may comprise a protective sleeve or coating, at least in the axial regions disposed within the support members 2a, 2b. Such a protective sleeve or coating may be formed from a material that is more durable than the main material from which the longitudinal structure 48 is formed.

Figure 4B:
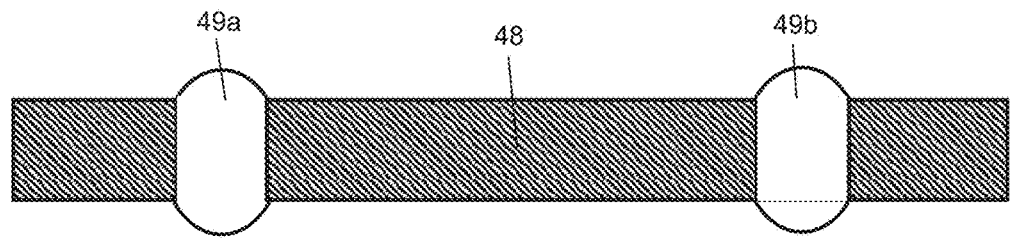
FIG. 4b is a side view of an example longitudinal member for an assembly according to the invention.

In some examples, collars are provided on the longitudinal structure, at axial locations corresponding to the locations of support members on which the longitudinal structure is to be supported. FIG. 4b shows the longitudinal structure 48 having two such collars 49a, 49b. The collars 49a, 49b are provided on the parts of the longitudinal structure 48 that are within the support members 2a, 2b when the longitudinal structure 48 is installed on the planar structures 35a, 35b. Each collar 49a, 49b is fixedly attached circumferentially to the longitudinal structure 48 by any suitable means, such as bonding or an interference fit. The collars 49a, 49b may be formed from any suitable material, such as a plastic material, rubber or metal. A rubber-type material may advantageously absorb vibration. The collars 49a, 49b may comprise a low-friction material such as PTFE, at least on their external surfaces. In some examples the collars 49a, 49b are formed from a highly resistive material, to enable electrical bonding between the longitudinal structure 48 and the support members 2a, 2b. In some examples the collars 49a, 49b are formed from an insulating material. In some examples the material of the collars 49a, 49b may be more durable than the material of the longitudinal structure 48.

Each collar 49a, 49b is shaped such that, when that collar is attached to the longitudinal structure 48, the angle between the external surface of the collar and the adjacent external surface of the longitudinal structure 48 is an obtuse angle. In some examples, the angle between the external surface of the collar and the adjacent external surface of the longitudinal structure 48 may be at least 135°. In the particular illustrated example, the collars 49a, 49b have an arcuate outer surface, although this is not necessarily the case in all examples. Configuring the collars 49a, 49b such that the angle between the external surface of each collar 49a, 49b and the adjacent external surface of the longitudinal structure 48 is an obtuse angle is advantageous because it enables the collars 49a, 49b to slide into the funnel parts of the support members 2a, 2b. Installation (and/or removal) of the longitudinal structure 48 on the ribs 35a, 35b is thereby facilitated. Such sliding may be further facilitated by forming at least the external surface of each collar 49a, 49b from a low-friction material.

Each collar 49a, 49b is configured to fit within the base of the funnel part of the corresponding support member. In the particular example shown in FIG. 4b, the external diameter of each collar 49a, 49b is substantially equal, and is slightly smaller than the internal base diameter of the funnel parts 21a, 23a, 21b, 23b. In examples in which the collars all have substantially the same external diameter, making the external diameter of the collars smaller than the internal base diameter of the funnel parts can facilitate installation of the longitudinal structure on the ribs. Other examples are possible in which each collar 49a, 49b has an external diameter substantially equal to the internal base diameter of the corresponding support member funnel part(s), or an external diameter larger than the internal base diameter of the corresponding support member funnel part(s). In some examples the external diameter of each collar and/or the internal base diameter of the funnel part(s) of the support member corresponding to that collar is selected to create an interference fit between the collar and the funnel base. In some examples each collar is configured to seal against the corresponding support member funnel base.

Figure 5A:
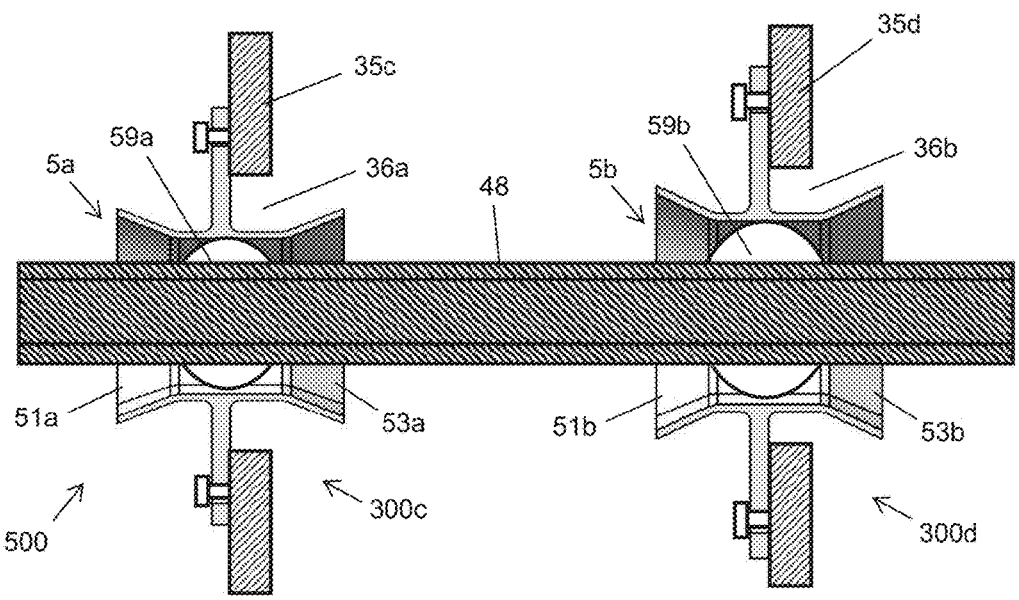
FIG. 5a is a cross-section through a third example assembly according to the invention.

FIG. 5a shows a further example assembly 500 comprising a first sub-assembly 300c and a second sub-assembly 300d, each of which has the same features as the example assembly 300 described above. The assembly 500 is shown with the longitudinal structure 48 installed on the ribs 35c, 35d of the sub-assemblies 300c, 300d. In this example the longitudinal structure 48 comprises collars 59a and 59b, which may have substantially the same features as the collars 49a and 49b described above.

The assembly 500 is the same as the assembly 400, except that the internal base diameter of the funnel parts 51a, 53a of the first support member 5a is not equal to the internal base diameter of the funnel parts 51b, 53b of the second support member 5b. In particular, the internal base diameter of the funnel parts 51a, 53a of the first support member 5a is smaller than the internal base diameter of the funnel parts 51b, 53b of the second support member 5b. First and second collars 59a, 59b are fixedly attached to the longitudinal structure 48. The collars 59a, 59b are the same as the collars 49a, 49b described above, except that the external diameters of the first and second collars 59a, 59b are not equal. The external diameter of the first collar 59a is smaller than the external diameter of the second collar 59b. The external diameter of the first collar 59a is substantially equal to the internal base diameter of the funnel parts of the first support member 5a and the external diameter of the second collar 59b is substantially equal to the internal base diameter of the funnel parts of the second support member 5b.

Providing support members having different funnel base diameters can facilitate the installation of a longitudinal structure on those support members. This is because, when the longitudinal structure 48 is inserted into the support members 5a, 5b from the right (as shown in FIG. 5a), the smaller diameter collar 59a passes easily through the larger diameter support member 5b, but does not pass as easily through the smaller diameter support member 5a. Similarly, the larger diameter collar 59b does not pass as easily through the larger diameter support member 59b. It may, therefore, become difficult to further move the longitudinal structure 48 to the left once the first and second collars 59a, 59b are received within the corresponding support members 5a, 5b. Correct axial positioning of the longitudinal structure 48 with relation to the support members 5a, 5b (and therefore with relation to the ribs 35c, 35d) can therefore be achieved without needing to see the longitudinal structure 48 or the support members 5a, 5b. Furthermore, axial movement to the right (i.e. in the direction of insertion) of the longitudinal structure 48 prior to achieving the desired axial position is relatively easy. As described above, correct radial positioning of the longitudinal structure 48 with relation to the support members 5a, 5b is achieved by the shape of the funnel parts, which functions to guide the collars 59a, 59b (and therefore the longitudinal structure 48) into a coaxial alignment with the support members 5a, 5b as each collar 59a, 59b is inserted into its corresponding support member 5a, 5b.

Although the example assembly 500 shown in FIG. 5a comprises two sub-assemblies, in principle the assembly 500 may comprise any number of sub-assemblies of the type shown in FIG. 3. In examples comprising more than two sub-assemblies, the internal funnel base diameter of each support member is different, and increases sequentially (either left to right, as in FIG. 5a, or right to left). If collars are provided on the longitudinal structure 48, each collar has an external diameter corresponding to the internal funnel base diameter of one of the support members, and the collars are arranged on the longitudinal structure 48 in order of increasing diameter. The difference in funnel base diameter between a given pair of adjacent support members in the sequence is preferably sufficient to allow the collar corresponding to the smaller support member to pass easily through the larger support member during installation of the longitudinal structure on the ribs. It will be appreciated that the installation benefits described above in relation to FIG. 5a apply equally to examples having more than two sub-assemblies.

Figure 5B:
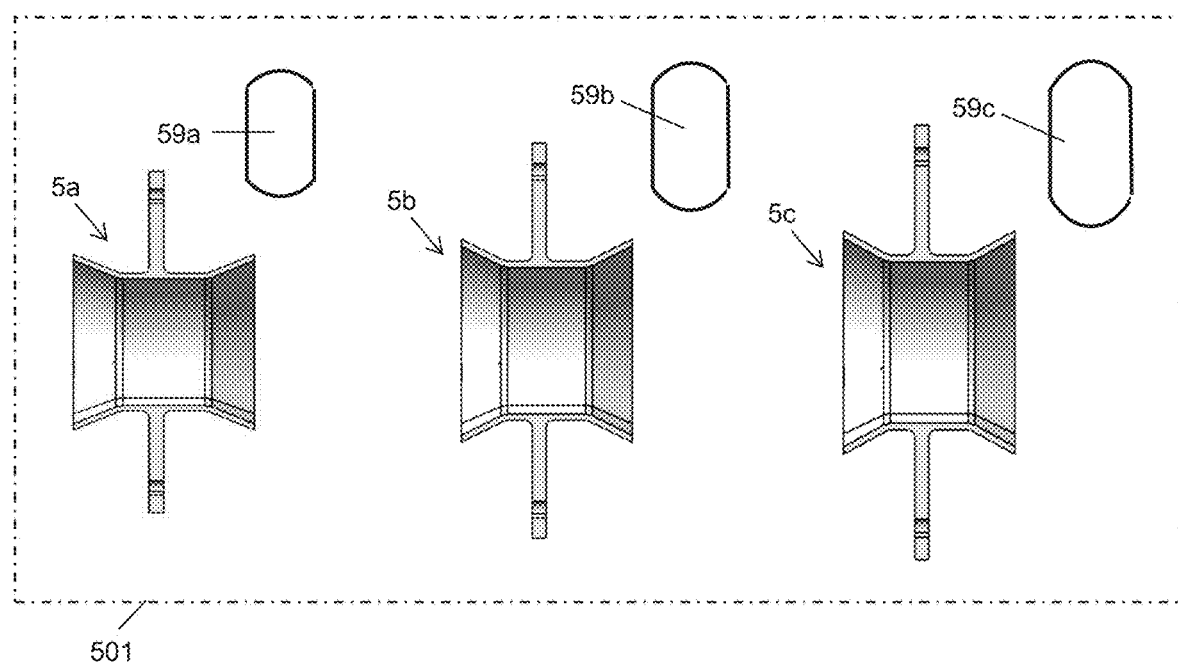
FIG. 5b shows an example kit of parts according to the invention.

A plurality of support members intended to support a longitudinal structure (e.g. the longitudinal structure 48) on a plurality of aircraft ribs (e.g. the ribs 35c, 35d) may be provided as a kit of parts. FIG. 5b shows an example kit of parts 501 comprising three support members 5a-c and three collars 59a-c. The kit of parts 501 therefore comprises the support members 5a, 5b and the collars 59a, 59b of FIG. 5a, as well as an additional support member 5c and an additional collar 59c. Other example kits of parts 501 need not include the collars 59a-c. In general, the kit of parts 501 may comprise N support members and, optionally, N collars. N may depend on the length and or flexibility of the longitudinal structure, and/or on a number of ribs that the longitudinal structure will pass through when installed on the plurality of ribs. This number need not be equal to the plurality of ribs which support the longitudinal structure, since not every rib that the longitudinal structure passes through necessarily has a support member attached to it. Ribs which do not have an attached support member may not be in contact with the longitudinal structure.

In the illustrated example each of the support members 5a-c is of the two funnel type and has substantially the same features as the example support member 2 described above. In other examples, each of the support members 5a-c may have a single funnel design and may have substantially the same features as the example support member 1 described above. The internal diameter of the funnel base of each support member 5a-c comprised in the kit of parts 501 is unique. Each collar 59a-c comprised in the kit of parts 501 corresponds to one of the support members 5a-c. Each collar 59a-c may have the same features as the example collars 49a, 49b, 59a, 59b described above in relation to FIGS. 4b and 5a.

The internal diameter of the funnel base of a given support member differs from the internal diameter of the funnel base of any other of the support members by an amount sufficient to allow the collar corresponding to the smaller of the given support member and the other support member to pass easily through the larger of the given support member and the other support member during installation of the longitudinal structure on the ribs. The external diameter of each collar 59a-c is unique and matches the internal funnel base diameter of the corresponding support member 59a-c. "Matches" means that the external diameter of a given collar has been selected in dependence on the internal funnel base diameter of the corresponding support member. In some examples matching external and internal diameters may be substantially equal. In other examples the external diameter may be larger than the internal diameter, or vice versa. In some examples the matching external and internal diameters may be selected to create an interference fit and/or a seal between the external surface of the collar and an internal surface of the support member.

Figure 5C:
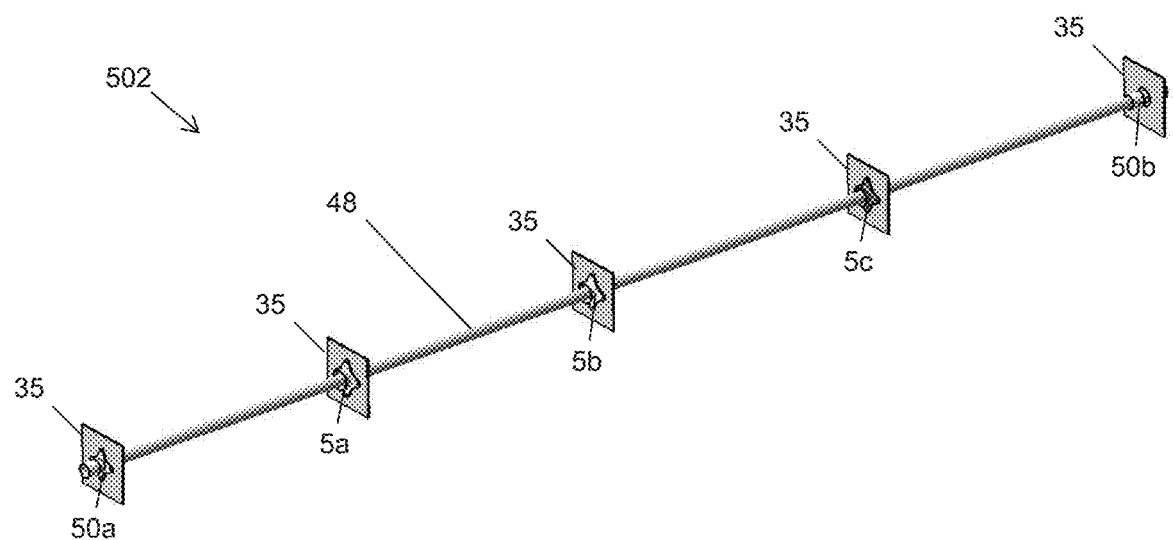
FIG. 5c shows an assembly formed from an example kit of parts according to the invention.

FIG. 5c shows a second example kit of parts 502, assembled on a plurality of ribs 35 and the longitudinal structure 48. The longitudinal structure 48 is installed on the ribs 35. The kit of parts 502 comprises the support members 5a-c and corresponding collars 59a-c (not visible in FIG. 5c). The kit of parts 502 further comprises a first end support member 50a and a second end support member 50b. The first end support member 50a is fixedly attached to the rib 35 that is nearest the left-hand end of the longitudinal structure 48, and the second end support member 50b is fixedly attached to the rib that is nearest the right-hand end of the longitudinal structure 48. The first end support member 50a is configured to block further axial movement of the longitudinal structure to the left, and the second end support member 50b is configured to block further axial movement of the longitudinal structure to the right. The purpose of the end support members 50a, 50b is to retain the longitudinal structure 48 in a desired axial position once it has been installed on the ribs. A desired axial position may be, for example, an axial position in which each collar is within a cylindrical part of its corresponding support member (rather than within a funnel part).

Figure 6:
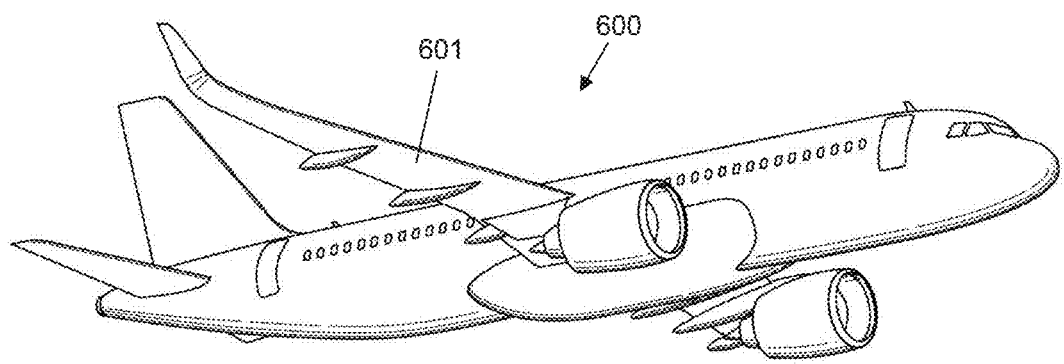
FIG. 6 shows an example aircraft comprising an assembly according to the invention.

FIG. 6 shows an example aircraft 600 having a wing 601 in which a longitudinal structure (e.g. a fuel pipe) has been installed on a plurality of ribs using support members according to the invention. Examples of the invention are particularly advantageous for installing a longitudinal structure into closed or confined spaces such as rib bays. These advantages will become apparent from the following discussion of FIG. 7.

Figure 7:
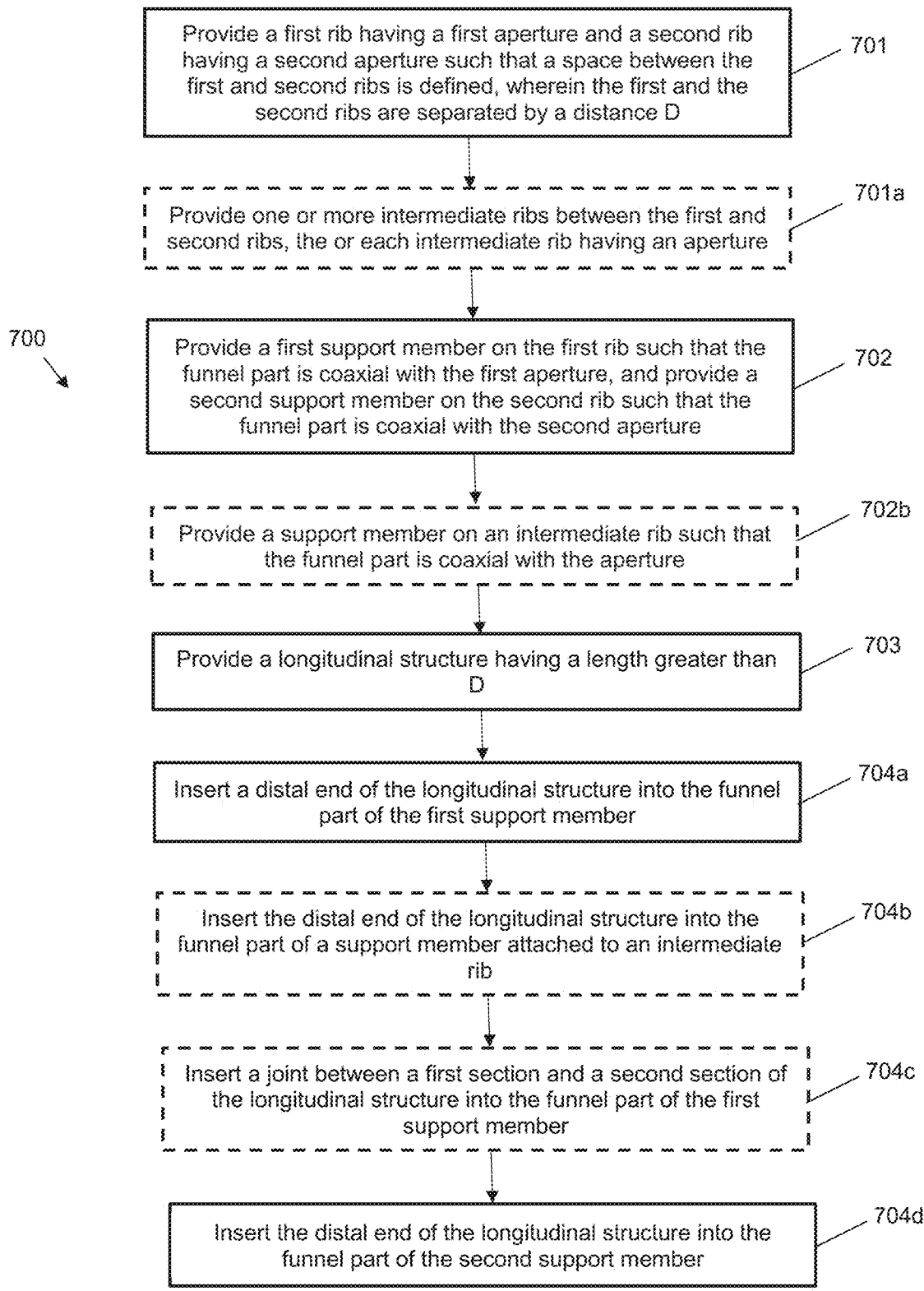
FIG. 7 is a flow chart illustrating an example method according to the invention.

FIG. 7 is a flow chart illustrating an example method 700 of installing a longitudinal structure on a plurality of ribs in an aircraft wing. The method 700 may be implemented using any example support members according to the invention, such as the example support members 1, 2 and 5 described above. The method 700 will be explained in relation to the particular example of installing an aircraft fuel pipe on a plurality of aircraft wing ribs, but it may equally be applied to any other situation where it is required to install a longitudinal structure on one or more aircraft wing ribs. The method 700 may be used for initial installation of the longitudinal structure during assembly of the aircraft. Alternatively, the method 700 may be used for installation of a replacement longitudinal structure during the in-service life of the aircraft.

In a first block 701 a first rib having a first aperture and a second rib having a second aperture are provided, such that a space between the first and second ribs is defined. The first and second ribs may have the features of any of the example ribs described above. The first and second ribs may be arranged substantially parallel to each other. The first and second apertures are coaxial. The first and the second ribs are separated by a distance D. In a particular example, each rib is comprised in the wing box of an aircraft wing and the space between the first and second ribs comprises one or more rib bays.

In an optional block 701a, one or more intermediate ribs are provided between the first and second ribs. The or each intermediate rib has an aperture. The intermediate ribs may be substantially parallel to the first and second ribs. The aperture(s) of the or each intermediate rib is coaxial with the apertures of the first and second ribs. The intermediate rib(s) may (but need not) have the same general design as the first and second ribs. In some implementations of the method 700, there may not be any such intermediate ribs (e.g. if the first and second ribs are adjacent ribs of a wing box), in which cases block 701a is omitted.

In block 702 a first support member is provided on the first rib and a second support member is provided on the second rib. In examples in which the method 700 is being implemented during assembly of an aircraft, providing the first support member on the first rib may comprise attaching the first support member to the first rib and providing the second support member of the second rib may comprise attaching the second support member to the second rib. The attachment may be by any suitable mechanism, such as fasteners. In the aircraft example, the first support member may be attached to a rib before the rib is assembled into the wing box. In examples in which the method 700 is being implemented to install a replacement longitudinal structure on an in-service aircraft, the first and second support members will already be attached to the first and second ribs. In some such examples, providing a support member on a rib may comprise attaching a replacement support member to a rib (after removal of a support member previously attached to that rib).

Each of the first and second support members may be a one-funnel support member, such as the example support member 1, or a two-funnel support member such as the example support members 2, 5. The first and second support members need not have the same design, although it may be advantageous for the first and second support members to be of the same type (i.e. one-funnel or two-funnel). The first support member is provided on the first rib such that the funnel part is coaxial with the first aperture and the second support member is attached to the second rib such that the funnel part is coaxial with the second aperture. The first and second support members are each provided such that their respective funnel parts have the same orientation. This orientation may be such that the mouth of each funnel part faces a direction from which the longitudinal structure will be inserted into the support members. In some examples the first support member funnel base has a larger internal diameter than the internal diameter of the second support member funnel base. In such examples, the first support member is provided on the rib nearest the direction from which the longitudinal structure will be inserted into the support members.

In examples in which at least one intermediate rib is provided, optional block 702b is performed. In block 702b an intermediate support member is provided on an intermediate rib such that the funnel part is coaxial with the aperture. Block 702b is performed in the same manner as block 702. Block 702b need not be performed in respect of every intermediate rib. In the aircraft wing example, support members may be provided on every other rib, or indeed any other subset of ribs comprised in the wing box. In some examples a support member is provided on each intermediate rib. Which intermediate ribs support members are provided on may be determined based on various factors including the distance (along the axis of the apertures) between adjacent support members and the structural properties (e.g. flexibility, mass, and the like) of the longitudinal structure.

There may be defined, based on the flexibility of the pipe, a maximum distance $d_{max}$ between adjacent support members in order to substantially prevent sagging of the longitudinal member after it has been installed on the ribs. In such a case, support members will be provided on ribs separated by a distance less than or equal to $d_{max}$. Where the ribs are close (e.g. separated by 0.5 $d_{max}$ or less), it will not be necessary to provide a support member on each rib, and may be desirable not to do so (e.g. to reduce cost, weight, installation time, or the like). It will be appreciated that in many applications the locations of the ribs are fixed and cannot be selected or altered.

In examples in which the first support member has a larger funnel base internal diameter than the second support member, each intermediate support member has a funnel base internal diameter value lying between the internal diameter of the first support member and the internal diameter of the second support member. Where multiple intermediate support members are used, the funnel base internal diameters of the intermediate support members may each be unique. The funnel base internal diameters of the intermediate support members may increase stepwise along the axial direction, with the largest being arranged adjacent to the first support member and the smallest being arranged adjacent to the second support member. The difference in funnel base internal diameter between adjacent support members may be equal. Alternatively, the difference in funnel base internal diameter between adjacent support members may be proportional to the axial separation of those adjacent support members.

In block 703 a longitudinal structure is provided. The longitudinal structure may have the same features as the example longitudinal structure 48 described above. The longitudinal structure has a length greater than D. The longitudinal structure may (but need not) be cylindrical. The longitudinal structure has a diameter smaller than the diameter of the apertures in the ribs. The longitudinal structure has a diameter less than or equal to the internal diameter of the smallest diameter support member. In some examples, the longitudinal structure comprises collars, such as the example collars 49, 59 described above. The longitudinal structure may comprise collars corresponding to the first and second support members and each intermediate support member. The collars, if present, are fixedly attached to the longitudinal structure at axial locations corresponding to the axial locations of the support members. In the aircraft example, the longitudinal structure is a fuel pipe, e.g. for transporting fuel from a fuel tank in the wing to an engine of the aircraft.

In examples where the method 700 is being used to install a longitudinal structure into an aircraft wing box during assembly of the aircraft, it is expected that the method will be performed before the wing is attached to the fuselage of the aircraft. As such, the longitudinal structure can be inserted into the wing box from the open root end of the wing box. In such examples the longitudinal structure can be provided as a continuous length. However; in examples in which the method 700 is being used to install a replacement longitudinal structure into an in-service aircraft, the wing will be attached to the fuselage such that the longitudinal structure cannot be inserted into the wing box through the root. In such examples, the longitudinal structure must be introduced into the wing box through an opening in one of the covers forming the wing box, such as a manhole. In such examples, the longitudinal structure must be provided in sections, which are then connected together within the wing box. A particular example implementation of the method 700 for installing a replacement longitudinal structure is described below, with reference to FIGS. 8 and 9*a-e*.

In block 704*a*, a distal end of the longitudinal structure is inserted into the funnel part of the first support member. As a result of the conical shape of the funnel part, once the distal end of the longitudinal structure has entered the mouth of the funnel part, further insertional movement of the longitudinal structure will cause the distal end to be guided to the funnel base and then through the support member. Since the diameter of the funnel mouth is significantly larger than the diameter of the longitudinal structure, the longitudinal structure does not need to be exactly coaxial with the first support member. In the aircraft example, the first support member may be disposed inside the wing box, where it is difficult or impossible for an installer to see the support member. The guiding function of the funnel part significantly facilitates insertion of the fuel pipe into the first support member in this situation. As discussed above, the insertion of the fuel pipe may be performed before the wing is attached to the aircraft, so that the fuel pipe can be inserted from a root end of the wing. This advantageously avoids the need to insert the fuel pipe through any manholes, and enables a relatively long length of fuel pipe to be installed as a single piece. The insertion may be driven in any suitable manner, e.g. manually by an installer or by a factory robot. During the inserting there is no contact with any part of the longitudinal structure disposed between the first and second ribs.

In examples in which at least one intermediate rib is provided, optional block 704*b* is performed. In block 704*b* the distal end of the longitudinal structure is inserted into the funnel part of an intermediate support member provided on an intermediate rib. Block 704*b* occurs after block 704*a*, such that the longitudinal structure passes through and is already supported by the first support member at the time of inserting the distal end of the longitudinal structure into the intermediate support member. Apart from this, block 704*b* is performed in the same manner as block 704*a*. During the inserting there is no contact with any part of the longitudinal structure disposed between the first and second ribs.

Visibility of the intermediate support member may be reduced as compared to visibility of the first support member, because it is expected that the first rib will be between the installer and the intermediate support member. However; the position of the longitudinal structure in the plane of the ribs is constrained by the first support member. This, together with the guiding function of the funnel part of the intermediate support member, means that it is relatively straightforward to insert the distal end of the longitudinal structure into the funnel part of the intermediate support member even when neither the distal end nor the intermediate support member is visible to the installer. In the aircraft example, the first rib and the intermediate rib are adjacent ribs, and the space between them is enclosed by spars and upper and lower cover panels. The only openings into this rib bay space are the apertures in the ribs where the support members are attached. Therefore, once the distal end of the fuel pipe has been inserted into the first support member, it is not possible to see inside the rib bay and therefore not possible to see the intermediate support member (or the distal end of the fuel pipe).

In some examples there may be a further structure (e.g. a further rib, or any other structure which may be present in an aircraft wing) disposed between the first rib and the intermediate rib. In such examples, the distal end of the longitudinal structure passes through or past the further structure. If the end of the longitudinal structure passes through the further structure, preferably an aperture in the further structure is at least as large as the funnel mouth of the intermediate support member, so that insertion of the longitudinal structure is not unduly hindered by the presence of the further structure. In some examples a camera may be provided on the distal end of the longitudinal structure to assist in guiding the insertion. Such a camera may communicate images to the installer, by any suitable mechanism (e.g. using a wireless communications protocol). The provision of a camera may be particularly useful for guiding the distal end of the longitudinal structure through such further structures which do not have support member funnel parts to provide a guiding function. The apertures in such further structures may be able to be smaller in examples in which a camera is provided on the distal end.

In examples in which multiple intermediate ribs and attached support members are provided, block 704*b* is performed in respect of each intermediate rib that has an attached intermediate support member.

In examples in which the longitudinal structure is provided in two or more sections, an optional block 704*c* is performed. In block 704*c*, a joint between a first section and a second section of the longitudinal structure is inserted into the funnel part of the first support member. In some examples performing block 704*c* may comprise forming the joint between the first and second sections within the first support member. In other examples, the joint may be formed upstream of the support member, and inserting the joint may comprise axially moving the first and second sections downstream, at least until the joint is within the support member.

In block 704*d*, the distal end of the longitudinal structure is inserted into the funnel part of the second support member. Block 704*d* is performed in the same manner as block 704*b*. Upon completion of block 704*d*, the longitudinal structure is in an installed position relative to the first and second ribs (and any intermediate ribs). The installed position may correspond to a final operational position of the longitudinal structure. In the installed position the distal end of the longitudinal structure may protrude from an opposite side of the second support member (that is, the side opposite to the side facing the first rib). In the installed position any collars disposed on the longitudinal structure are within their corresponding support members. Block 704*d* may be performed by manipulating the longitudinal structure at or near a second (proximal) end of the longitudinal structure opposite to the end being inserted (the distal end).

In examples in which there is at least one intermediate support member and the internal funnel base diameters of the support members progressively decrease from the first support member to the second support member, the longitudinal member (whether or not it comprises collars) slides relatively easily along the direction of insertion until it reaches the installed position. This is because the funnel base internal diameters of the first and intermediate support members are significantly larger than the diameter of the longitudinal structure, and are also larger than any collar corresponding to the second support member. Thus all parts of the longitudinal structure which must pass through the first and intermediate support members have a diameter sufficiently smaller than the internal diameters of the first and intermediate support members that frictional forces between the longitudinal structure and the first and intermediate support members are low.

If the external diameter of the region of the longitudinal structure that is intended to rest inside the second support member in the installed position is substantially equal to the internal funnel base diameter of the second support member, the frictional forces will increase significantly when this region enters the second support member, and a resistance to further insertion will be felt by the installer. In examples in which the longitudinal structure comprises collars having diameters corresponding to the internal diameters of each of the support members, in the installed position these collars will be within their corresponding support members and contact between the collars and the corresponding support members will contribute to the increased resistance to further insertional movement. This effect provides a way for the installer to know when the longitudinal structure has reached the installed position without being able to see the distal end of the longitudinal structure. The collars may therefore have a beneficial effect of facilitating the insertion process, as well as the protective functions described above in relation to FIG. 4*b*.

At least blocks 704*a*-*d* of the method of FIG. 7 may be reversed in order to remove the longitudinal structure from the first and second ribs (and any intermediate ribs). In the aircraft example, it may be desired to remove a fuel pipe for repair or replacement, during the operational lifetime of the aircraft. In examples in which the longitudinal structure comprises collars, the use of two-funnel type support members may facilitate such removal since the additional funnel parts serve to guide the collars into and through the support members as the longitudinal structure is moved axially (in the opposite direction to the insertion direction). In the aircraft example, blocks 701-703 cannot be reversed without dismantling the wing box (and therefore cannot be reversed for an in-service repair or maintenance operation) as it is not possible to access the interior of the wing box to remove the support members.

The method of FIG. 7 may further comprise providing an end connector (such as the example end connector 50*b*) on one or both of the distal end of the longitudinal structure and the proximal end of the longitudinal structure, after the distal end has been inserted into the second support member. Such an end connector may be mounted on a further structure. The details of such end connectors are outside of the scope of this invention and will not be further described.

An example implementation of the method 700 to install a replacement longitudinal structure into a wing box of an in-service aircraft will now be described. An original longitudinal structure previously installed in the wing box has already been removed, for example in the manner discussed above.

Removal of the original longitudinal structure is outside the scope of the present invention and therefore will not be discussed in detail. However, a suitable removal method may involve any or all of: accessing an interior space of the wing box in which at least a part of the longitudinal structure is present via an opening (such as a manhole), cutting a section out of the longitudinal structure of a suitable size that the section can be removed through the opening, removing the section, and axially moving the longitudinal structure (e.g. by pulling on the cut end) such that a different section is present within the interior space and can be cut for removal.

Blocks 701 and 702 (and, if applicable, optional blocks 701*a* and 702*a*) are performed simply by providing the wing box into which the replacement longitudinal structure is to be installed. The wing box will already comprise the first and second ribs, and the first and second support members will already be in place on the first and second ribs. In this particular example the wing box is provided as part of an in-service aircraft, and is therefore attached (at the root end) to the fuselage of the aircraft. Access into the interior space(s) of the wing box is possible only through an opening in either the upper or lower wing cover panel. In the particular illustrated example, the aircraft wing does not comprise manholes and so an opening has been created in the upper cover panel of the wing, near the root, in order to introduce the replacement longitudinal structure into the wing box. Alternatively, a similar opening could be created in the lower cover panel. In examples in which the aircraft wing comprises one or more manholes, a manhole can be opened and used to introduce the replacement longitudinal structure into the wing box.

Figure 8:
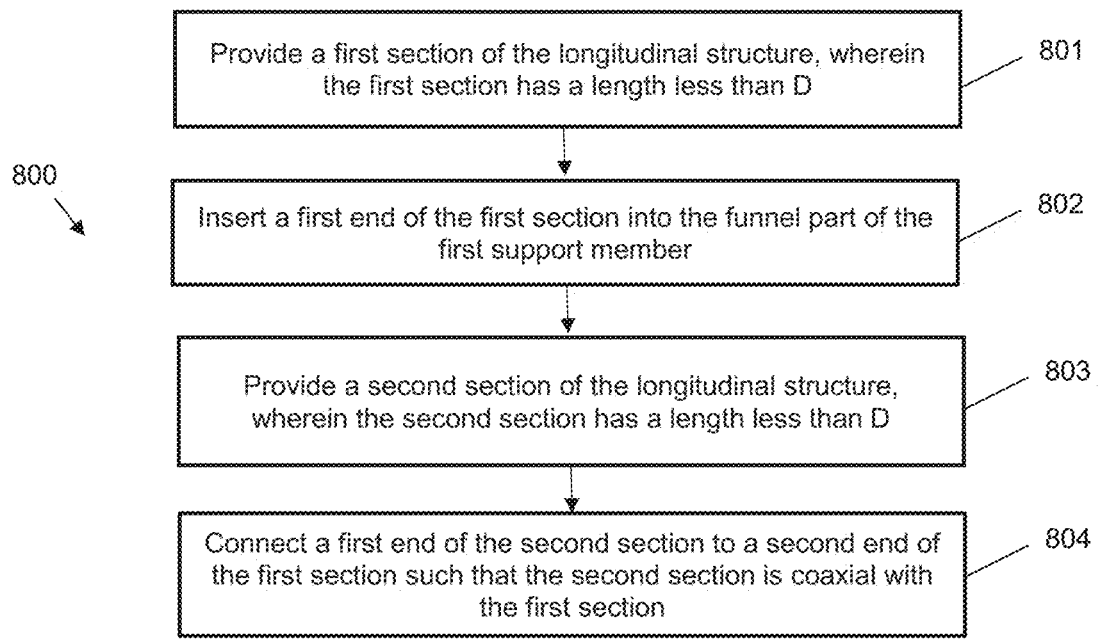
FIG. 8 is a flow chart illustrating a further example method according to the invention.

Performing block 703 comprises providing the replacement longitudinal structure in two or more sections. FIG. 8 is a flow chart illustrating an example sub-method 800 of providing a longitudinal structure having a length greater than D, which is suitable for use in installing a replacement longitudinal structure into an in-service aircraft. The sub-method 800 may be implemented to perform block 703 of the method 700.

FIGS. 9*a*-*e* illustrate a particular example implementation of the sub-method 800. FIGS. 9*a*-*d* show a spanwise cross-section through an example wing box comprising an upper cover 96, a lower cover 97, and front and rear spars (not visible). The wing box further comprises multiple ribs 95*a*-*e* (of which only a root rib 95*a* and a first rib 95*b* are visible in FIGS. 9*a*-*d*). The root rib 95*a* does not comprise an opening. The first rib 95*b* is equivalent to the first rib referred to in the method 700. A second rib 95*c* equivalent to the second rib of the method 700 is disposed to the right of the first rib 95*b*, but is only visible in FIG. 9*e*. The first rib 95*b* comprises an opening in which a support member 2 according to the invention is mounted. In the illustrated example the support member 2 has the same design as the example support member 2 of FIGS. 2*a* and 2*b*. The root rib 95*a* and the first rib 95*b* are separated by a distance D. Other adjacent rib pairs of the wing box may be separated by a distance greater, less than or equal to D. Each adjacent pair of ribs bounds a rib bay. The rib bay shown in FIGS. 9*a*-*d* has an opening 99 formed in the upper cover to provide access into the rib bay from outside the wing box. The size and shape of the opening 99 is configured such that each section of the replacement longitudinal structure is able to be introduced into the rib bay through the opening 99.

In a first block 801 of the sub-method 800, a first section 98a of the replacement longitudinal structure is provided. The first section 98a has a length less than D. In the illustrated example the first section 98a has a length $d_1$. In this example $d_1$ and $d_2$ are substantially equal, although this need not be the case in other examples. In some examples the length $d_1$ is selected to be as long as possible whilst allowing the first section 98a to be introduced into the space between the adjacent ribs 95a and 95b through the opening 99 and then inserted into an opening of one of the support members 2a, 2b. The length $d_1$ may be less than a shortest distance between the support members 2a and 2b. In some examples the length $d_1$ is selected such that a joint between the first section 98a and a further section of the longitudinal structure will sit close to or within a support member when the replacement longitudinal structure is in its final installed position relative to the wing box. Advantageously, ensuring that a joint between section is close to or within a support member can reduce the loading experienced by the joint and may enable a smaller connector to be used.

A first end (the right-hand end as illustrated) of the first section is configured to form an end section of the replacement longitudinal structure, and may therefore comprise an end-cap. In other examples the first end may be configured to connect to a section of a longitudinal structure already installed within the wing box (e.g. a section of an original longitudinal structure that was installed during assembly of the aircraft). A second end (the left-hand end as illustrated) of the first section 98a is configured to connect to a second section 98b of the replacement longitudinal structure. To facilitate this connection, the second end of the first section 98a comprises a connector 981. The connector 981 may be of any suitable design which retains the pipe end within the connector and resists axial separation of the pipe end and connector. For example, the connector 981 may be a push-fit connector or a screw connector. In some examples, the connector is configured to sit within a support member when the replacement longitudinal structure is in its installed position. In some such examples the connector may be configured to function in the same manner as one of the example collars 59 described above.

Figure 9A:
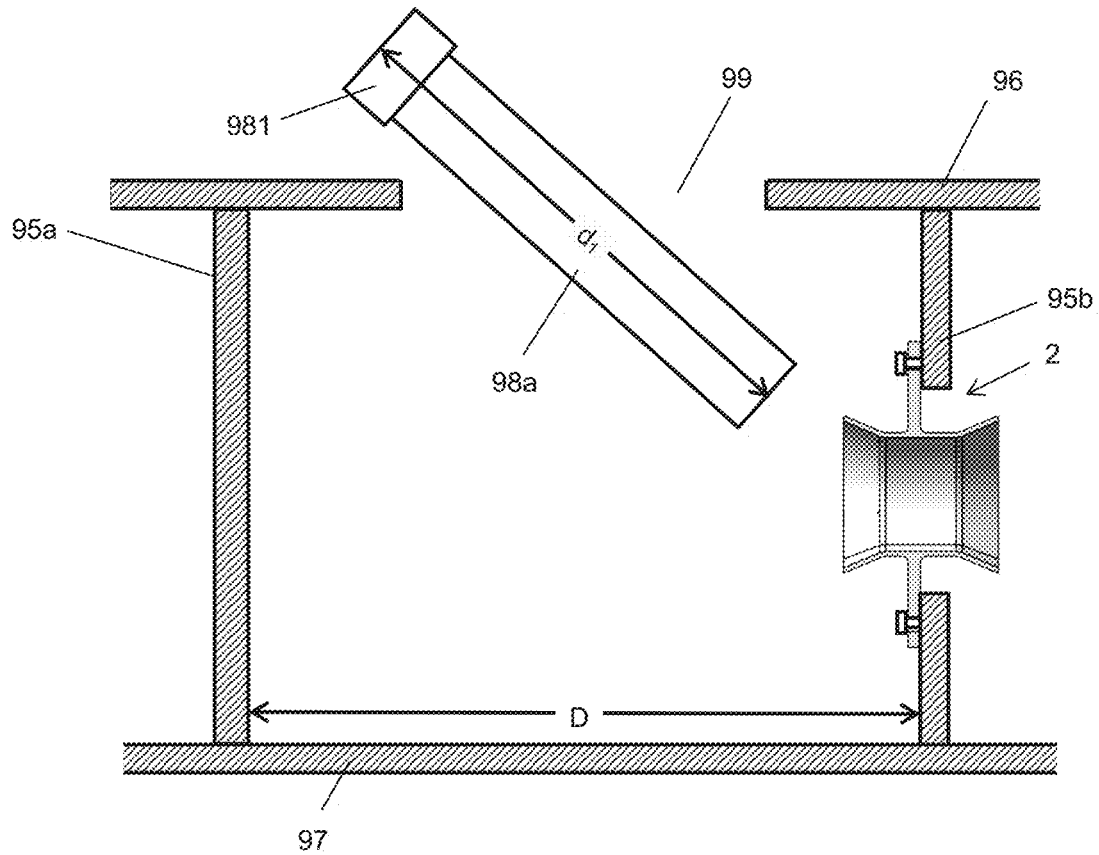
FIGS. 9a-e are schematic side views of an example assembly according to the invention at various stages during a process of replacing a longitudinal structure comprised in the assembly.
Figure 9B:
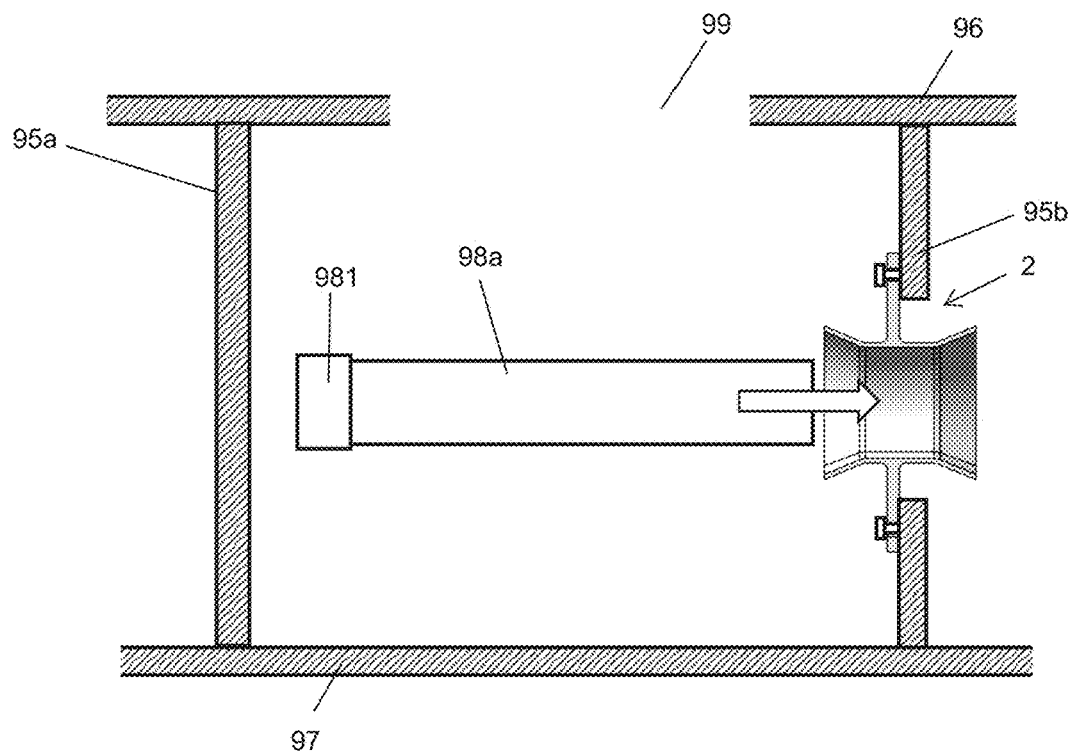

Providing the first section 98a may comprise introducing the first section 98a into an interior space of the wing box and positioning it ready for insertion into one of the support members 2a, 2b. FIG. 9a shows the first section 98a as it is being introduced into the rib bay bounded by the root rib 95a and the first rib 95b through the opening 99. FIG. 9b shows the first section 98a after it has been introduced into the rib bay but before either end has been inserted into the support member 2. In FIG. 9b the first section 98a has been positioned ready for insertion of the right-hand end into the support member 2—that is, the first section 98a is approximately coaxial with the support member 2. The introducing and positioning of the first section 98a may be done manually, or using any suitable automated equipment, such as an industrial robot.

In a second block 802, a first end of the first section 98a is inserted into the funnel part of the support member 2. Block 802 is equivalent to and replaces block 704a of the method 700. In the illustrated example the first end is the right-hand end. Block 802 is performed in substantially the same manner as block 704a, except that whatever is used to support and manipulate the first section 98a (e.g. a person's arm, a tool, a part of an industrial robot, or the like) must extend through the opening 99. Insertional movement of the first end of the first section 98a into the funnel part of the support member 2 is indicated on FIG. 9b by the block arrow.

In a third block 803, a second section 98b of the replacement longitudinal structure is provided. The second section 98b has a length less than D. In the illustrated example the second section 98b has a length dz. In this example $d_2$ is substantially equal to $d_1$, although this need not be the case in other examples. In some examples the length $d_2$ is selected to be as long as possible whilst allowing the second section 98b to be introduced into the space between the adjacent ribs 95a and 95b through the opening 99 and then inserted into an opening of the support member 2 and/or connected to a second end of the first section 98a. The length $d_2$ may be less than a shortest distance between the support member 2 and the first rib 95a. In some examples the length $d_2$ is selected such that a joint between the second section 98b and a further section of the longitudinal structure will sit close to or within a support member when the replacement longitudinal structure is in its final installed position relative to the wing box.

The second section 98b has substantially the same configuration as the first section 98a, although it may have a different length as noted above. In particular, the cross-sectional shape and diameter of the first and second sections is the same. A first end of the second section 98b (the right-hand end as illustrated) is configured to be connected to the connector 981. In the illustrated example the second section does not comprise a connector, although in other examples a second end (the left-hand end as illustrated) of the second section 98b (that is, an end which is not configured to be connected to the connector 981 of the first section 98a) may comprise a connector having a design similar or equivalent to that of the connector 981.

Figure 9C:
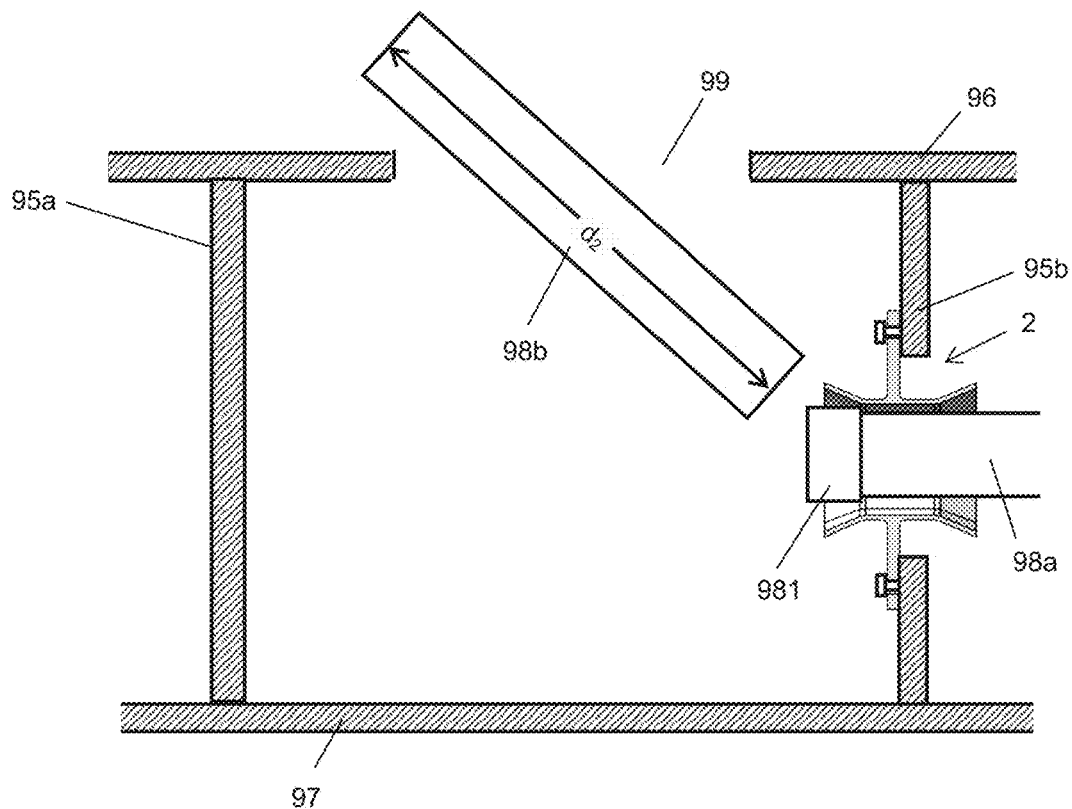

Providing the second section 98b may comprise introducing the second section 98b into the same interior space of the wing box as the first section 98a was introduced into, and positioning the second section 98b ready for connection to the first section 98a. FIG. 9c shows the second section 98b as it is being introduced into the rib bay bounded by the ribs 95a, 95b through the opening 99. The introducing and positioning of the second section 98b is done in substantially the same manner as the introducing and positioning of the first section 98a.

Figure 9D:
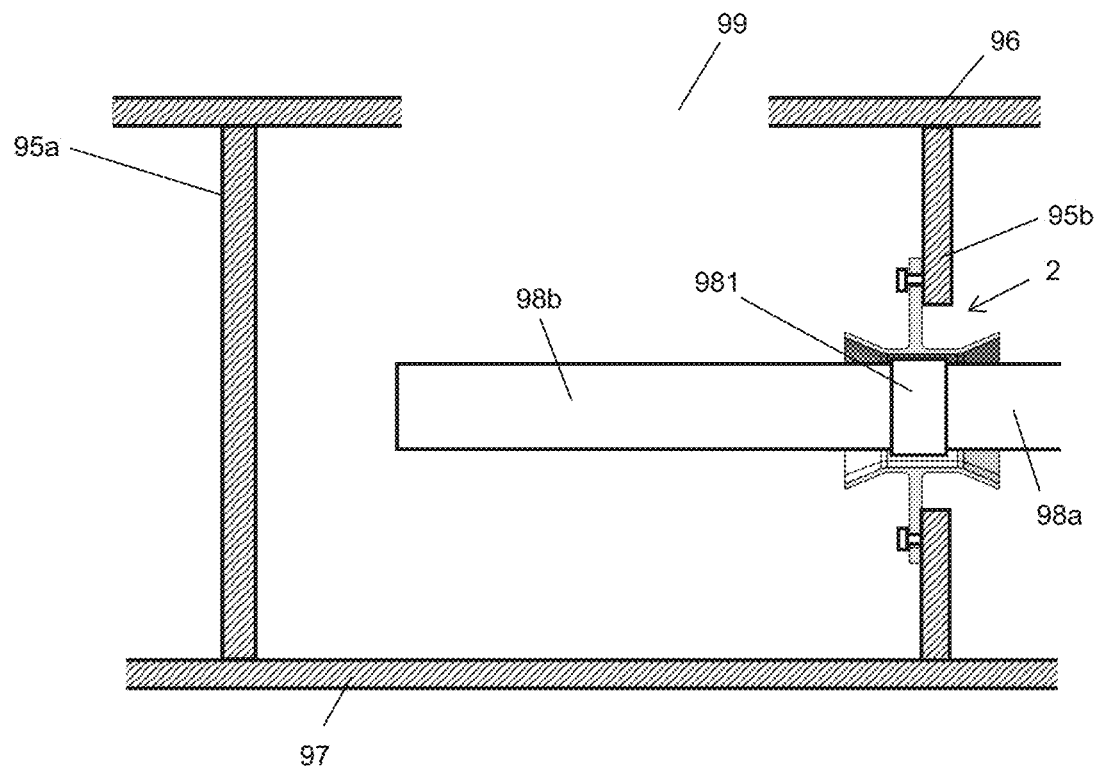

In a fourth block 804, the first end of the second section 98b is connected to the second end of the first section 98a such that the second section 98b is coaxial with the first section 98a. Performing block 804 may comprise engaging the first end of the second section 98b with a connector provided on the second end of the first section 98a. In the illustrated example, performing block 804 comprises engaging the first end of the second section 98b with the connector 981. The manner of the engagement will depend on the design of the connector 981—for example if the connector 981 is a screw connector, then engaging the first end of the second section 98b with the connector 981 will comprise rotating the second section 98b relative to the connector 981. FIG. 9d shows the replacement longitudinal structure after completion of block 804.

The sub-method 800 may be repeated in respect of further sections of the replacement longitudinal structure, until the full length of the replacement longitudinal structure has been installed within the wing box. To install a further section, a further connector would be provided on the second end of the second section 98b and following the completion of block 804 the connected first and second sections 98a, 98b would be moved to the right until the further connector is adjacent to or within the support member 2. This movement may comprise inserting the joint between the first and second sections 98a, 98b into the funnel part of the support member 2, in which case the movement corresponds to performing optional block 704c of the method 700. The movement may comprise inserting the first end of the first section 98a into a further support member (not shown) provided on the second rib 95c (and subsequently into yet further support members provided on the third, fourth and fifth ribs 95d-f, shown in FIG. 9e). In such examples the movement alternatively or additionally corresponds to performing block 704d of the method 700. Each section of the replacement longitudinal structure only reaches its final installed position after all sections have been introduced into the wing box and connected together.

Figure 9E:
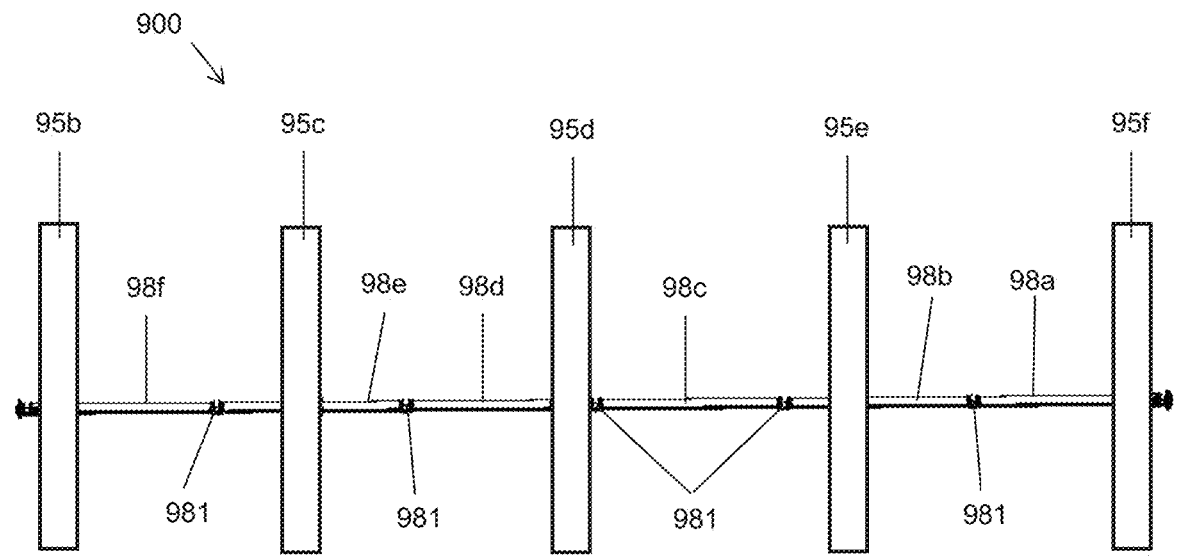

FIG. 9e shows an example aircraft assembly 900 formed as a result of installing a replacement longitudinal structure into a wing box using the method 700 and the sub-method 800. The assembly 900 comprises the first rib 95b and four further ribs 95c-f, which each comprise an opening and a support member. The root rib 95a is present to the left of the first rib 95b, but is not visible in FIG. 9e. The complete replacement longitudinal structure formed by the first and second sections 98a, 98b, as well as four further sections 98c-f, is installed on the ribs 95b-f. In this example the connectors 981 between the sections are not disposed within the support members and hence are not configured to function as collars. In such examples, preferably collars (such as the example collars 49 or 59) are provided on the sections of the replacement longitudinal structure, at locations which are within the support members in the final installed position of the replacement longitudinal structure. End caps are provided on the first end of the first section 98a and the second end of the sixth section 98f, although this need not be the case in other examples.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

The invention claimed is:

1. An aircraft assembly comprising:
 a rib having an aperture; and
 a support member for supporting a substantially longitudinal structure within the aperture, the support member having a funnel part and a bracket being fixedly attached to the rib such that the funnel part is coaxial with the aperture,
 wherein the diameter of the base of the funnel is less than or equal to the diameter of the aperture, and is substantially equal to the diameter of a part of the substantially longitudinal structure.

2. An aircraft assembly according to claim 1, wherein the support member extends through the aperture and has an additional funnel part coaxial with the funnel part, and wherein the funnel part extends away from a first side of the rib and the additional funnel part extends away from a second, opposite side of the rib.

3. An aircraft assembly according to claim 1, further comprising:
 a further rib having a further aperture; and
 a further support member for supporting a substantially longitudinal structure within the aperture, the further support member having a further funnel part and being fixedly attached to the further rib such that the funnel part is coaxial with the aperture;
 wherein the further aperture is coaxial with the aperture.

4. An aircraft assembly according to claim 3, wherein the diameter of the base of the funnel part is greater than the diameter of the base of the further funnel part.

5. An aircraft assembly according to claim 1, further comprising a substantially longitudinal structure within the aperture, wherein the longitudinal structure is oriented coaxially with the funnel part of the support member and extends through the funnel part of the support member.

6. An aircraft assembly according to claim 5, wherein the external diameter of at least the part of the longitudinal structure disposed within the base of the funnel part is substantially equal to the internal diameter of the base of the funnel part.

7. An aircraft assembly according to claim 6, wherein the longitudinal structure comprises a collar configured to fit within the base of the funnel part.

8. An aircraft assembly according to claim 7, wherein the collar is configured to seal against the base of the funnel part.

9. An aircraft assembly according to claim 6, further comprising:
 a further rib having a further aperture; and
 a further support member for supporting a substantially longitudinal structure within the aperture, the further support member having a further funnel part and being fixedly attached to the further rib such that the funnel part is coaxial with the aperture;
 wherein the further aperture is coaxial with the aperture; and
 wherein the external diameter of a first part of the longitudinal structure which is disposed within the base of the funnel part is substantially equal to the internal diameter of the base of the funnel part, and the external diameter of a second part of the longitudinal structure which is disposed within the base of the further funnel part is substantially equal to the internal diameter of the base of the further funnel part.

10. An aircraft assembly according to claim 1, wherein at least part of the support member has a low-friction coating.

11. An aircraft comprising an assembly according to claim 1.

12. The aircraft assembly of claim 1, wherein the bracket has a substantially flat surface configured to abut a substantially flat surface of the rib.

13. The aircraft assembly of claim 1, wherein the bracket is a flange which at least partially cover the aperture when the support member is attached to the rib.

14. The aircraft assembly of claim 1, wherein the bracket is a flange which completely covers the aperture when the support member is attached to the rib.

15. A kit of parts comprising a plurality of support members, each support member being configured to support a longitudinal structure within an aperture of an aircraft wing rib and each support member comprising a funnel part and a flange for attaching the support member to the rib,
 wherein the diameter of the narrow end of the funnel part is less than or equal to the diameter of the aperture, and is substantially equal to the diameter of a part of the longitudinal structure to be supported by the support member, and
 wherein the internal diameter of the narrow end of the funnel part of each support member is unique.

16. A kit of parts according to claim 15, further comprising a plurality of collars, each collar corresponding to one of the support members, wherein each collar is configured to be fixedly attached circumferentially to a longitudinal structure and wherein the external diameter of each collar is unique and matches the internal diameter of the funnel base of the corresponding support member.

17. A kit of parts according to claim 16, wherein the external diameter of each collar and/or the internal diameter of the funnel base of the support member corresponding to that collar is selected to create an interference fit between the collar and the funnel base when the collar is disposed within the funnel base.

18. A kit of parts according to claim 16, wherein each collar is shaped such that, when that collar is attached to the longitudinal structure, the angle between the external surface of the collar and the adjacent external surface of the longitudinal structure is an obtuse angle.

19. A method of installing a longitudinal structure on a plurality of ribs in an aircraft wing, the method comprising:
providing a first rib having a first aperture and a second rib having a second aperture such that a space between the first and second ribs is defined, wherein the first and the second ribs are separated by a distance D;
providing a first support member having a first funnel part and a first bracket on the first rib such that the funnel part is coaxial with the first aperture, and providing a second support member having a second funnel part and a second bracket on the second rib such that the funnel part is coaxial with the second aperture;
providing a longitudinal structure having a length greater than D; and
inserting an end of the longitudinal structure into the funnel part of the first support member and subsequently inserting the end of the longitudinal structure into the funnel part of the second support member; wherein during the inserting, there is no structural contact with any part of the longitudinal structure disposed between the first and second ribs.

20. A method according to claim 19, further comprising:
providing one or more intermediate ribs between the first and second ribs, the or each intermediate rib having an aperture;
providing a support member having a funnel part on the or each intermediate rib such that the funnel part is coaxial with the aperture; and
after inserting the end of the longitudinal structure into the funnel of the first support member and before inserting the end of the longitudinal structure into the funnel part of the second support member, inserting the end of the longitudinal structure into the funnel part of the support member on the or each intermediate rib.

21. A method according to claim 19, wherein providing a longitudinal structure having a length greater than D comprises:
providing a first section of the longitudinal structure, wherein the first section has a length less than D;
inserting a first end of the first section into the funnel part of the first support member;
providing a second section of the longitudinal structure, wherein the second section has a length less than D; and
connecting a first end of the second section to a second end of the first section such that the second section is coaxial with the first section.

22. A method according to claim 21, wherein between the inserting of the end of the longitudinal structure into the funnel part of the first support member and the inserting of the end of the longitudinal structure into the funnel part of the second support member, the method comprises inserting a joint between the first section and the second section into the funnel part of the first support member.

* * * * *